United States Patent
Hsu et al.

(10) Patent No.: US 9,387,519 B2
(45) Date of Patent: Jul. 12, 2016

(54) DEWAXING DEVICE

(71) Applicant: Cheng Uei Precision Industry Co., Ltd., New Taipei (TW)

(72) Inventors: Che Wei Hsu, New Taipei (TW); Cheng Yu Chou, New Taipei (TW); Cheng An Chiang, New Taipei (TW); Chih Wei Cheng, New Taipei (TW)

(73) Assignee: CHENG UEI PRECISION INDUSTRY CO., LTD., New Taipei (TW)

( * ) Notice: Subject to any disclaimer, the term of this patent is extended or adjusted under 35 U.S.C. 154(b) by 402 days.

(21) Appl. No.: 13/966,257

(22) Filed: Aug. 13, 2013

(65) Prior Publication Data

US 2015/0047681 A1   Feb. 19, 2015

(51) Int. Cl.
*B08B 3/02*        (2006.01)
*B22F 3/00*        (2006.01)
*B22F 3/24*        (2006.01)
*B01D 21/00*       (2006.01)
*C10G 73/06*       (2006.01)
*B22F 3/22*        (2006.01)

(52) U.S. Cl.
CPC .............. *B08B 3/02* (2013.01); *B01D 21/009* (2013.01); *B22F 3/003* (2013.01); *B22F 3/24* (2013.01); *B22F 3/225* (2013.01); *B22F 2003/241* (2013.01); *C10G 73/06* (2013.01)

(58) Field of Classification Search
CPC .................. B22F 2003/241; B22F 2003/244; B22F 3/1025; B22F 3/003; B22F 3/24; B01D 21/009; C10G 73/06; B08B 3/02; B08B 9/093
USPC .................................... 134/104.4; 208/31, 33
See application file for complete search history.

(56) References Cited

U.S. PATENT DOCUMENTS

| | | | | |
|---|---|---|---|---|
| 2,048,244 A * | 7/1936 | Bray | ...................... | C10G 73/06 159/DIG. 25 |
| 2,059,166 A * | 10/1936 | Banks | .................. | C10G 73/025 208/31 |
| 2,302,431 A * | 11/1942 | Dons | ...................... | C10G 73/06 196/14.5 |
| 3,729,414 A * | 4/1973 | Harris | .................... | B01D 33/09 210/217 |
| 4,820,462 A * | 4/1989 | Nakajima | ............. | C04B 35/632 264/233 |
| 5,112,577 A * | 5/1992 | Nishio | .................. | B22F 3/1025 134/108 |
| 6,413,480 B1 * | 7/2002 | Vishnevsky | ............ | C10G 73/06 422/198 |
| 8,430,944 B2 * | 4/2013 | Iijima | ...................... | B22F 9/20 75/368 |

* cited by examiner

*Primary Examiner* — Joseph L Perrin
*Assistant Examiner* — Kevin G Lee
(74) *Attorney, Agent, or Firm* — Cheng-Ju Chiang

(57) ABSTRACT

A dewaxing device includes a dewaxing system which includes a rinsing device and a storage device connected with the rinsing device via a circulation pipe, and a recycling system which includes a containing trough connected with the storage device and a recycling trough connected between the containing trough and the storage device. The recycling system further includes a rotating device, a condensing unit and a heating unit which cooperate to treat mixed solution with wax into pure chemical solvent in the containing trough. The rotating device is rotatably mounted above the containing trough with the bottom half thereof being dived into the mixed solution. The condensing unit and the heating unit are disposed at two opposite sides of the top half of the rotating device. The rotating device is rotated towards the condensing unit.

2 Claims, 3 Drawing Sheets

DEWAXING DEVICE

BACKGROUND OF THE INVENTION

1. Field of the Invention

The present invention relates to a dewaxing device, and more particularly to a chemical dewaxing device used in dewaxing process of the metal injection molding.

2. The Related Art

Metal injection molding is a metalworking process where finely-powdered metal is mixed with a measured amount of binder and wetting agent to comprise a feedstock capable of being handled by plastic processing equipment through a process known as injection mold forming. Subsequent conditioning operations are performed on the molded shape, where the wetting agent and the binder are removed from a green part of product and metal particles are coalesced into the desired state for the metal alloy. In detail, the wetting agent is removed by chemical solvent or sintering furnace to form pores in dewaxing process of the metal injection molding, and the binder is thermal-cracked into binder gas to go out through the pores in sintering process of the metal injection molding.

In order to effectively achieve the dewaxing process, it is a common way that the wetting agent is removed by the chemical solvent. In detail, the wetting agent can be removed by repeatedly rinsing the green part of product with the chemical solvent or keeping soaking the green part of product in the chemical solvent so as to dissolve the wetting agent out of the green part of product, wherein the chemical solvent can be n-hexane, n-butane, bromopropane, cleaning naphtha and so on. Because of increased awareness of environmental protection, the chemical solvent has gradually tended to use the bromopropane solvent which has recyclable characteristics.

In the dewaxing process, when the bromopropane solvent reaches saturation state, a recycling process is done. In detail, in the recycling process, the saturated solution needs to be heated to boiling to separate into bromopropane steam and high concentration of non-volatile liquid waste wax. Then utilize a condensing unit to condense the bromopropane steam into liquid so as to obtain pure bromopropane solvent again. The high concentration of non-volatile liquid waste wax is removed out. However, in the recycling process, the saturated solution needs to be heated to boiling and then be cooled so that will have a strong impact on use life of the bromopropane solvent. So, a dewaxing device having an improved recycling system for doing the recycling process is required.

SUMMARY OF THE INVENTION

An object of the present invention is to provide a dewaxing device of utilizing chemical solvent to dewax a green part of product formed by metal injection molding. The dewaxing device includes a dewaxing system for dewaxing the green part of product and a recycling system. The dewaxing system includes a rinsing device where the green part of product is placed and a storage device where the chemical solvent is stored. The storage device is connected with the rinsing device via a circulation pipe for utilizing the chemical solvent to soak and rinse the green part of product. The recycling system includes a containing trough which is connected with the storage device for containing mixed solution with wax from the storage device, and a recycling trough which is connected between the containing trough and the storage device for containing and conveying pure chemical solvent from the containing trough back into the storage device to be reused. The recycling system further includes a rotating device, a condensing unit and a heating unit which cooperate to treat the mixed solution with wax into the pure chemical solvent in the containing trough. The rotating device is rotatably mounted above the containing trough with the bottom half thereof being dived into the mixed solution. The condensing unit and the heating unit are disposed at two opposite sides of the top half of the rotating device. The rotating device is rotated towards the condensing unit.

As described above, according to the technical principle that the soluble wax quantity of the chemical solvent does change with temperature, the dewaxing device in this invention utilizes the cooperation design of the rotating device and the condensing and the heating units to effectively remove the wax in the mixed solution and obtain pure chemical solvent in the recycling process.

BRIEF DESCRIPTION OF THE DRAWINGS

The present invention will be apparent to those skilled in the art by reading the following description, with reference to the attached drawings, in which.

DETAILED DESCRIPTION OF THE PREFERRED EMBODIMENT

Figure 1:
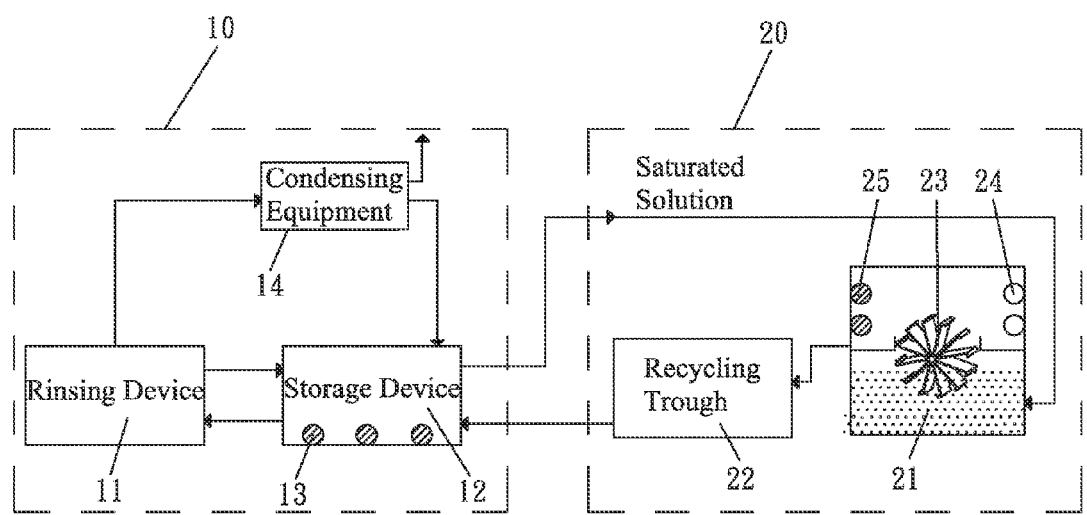
FIG. 1 is a view of a dewaxing device according to an embodiment of the present invention.
Figure 2:
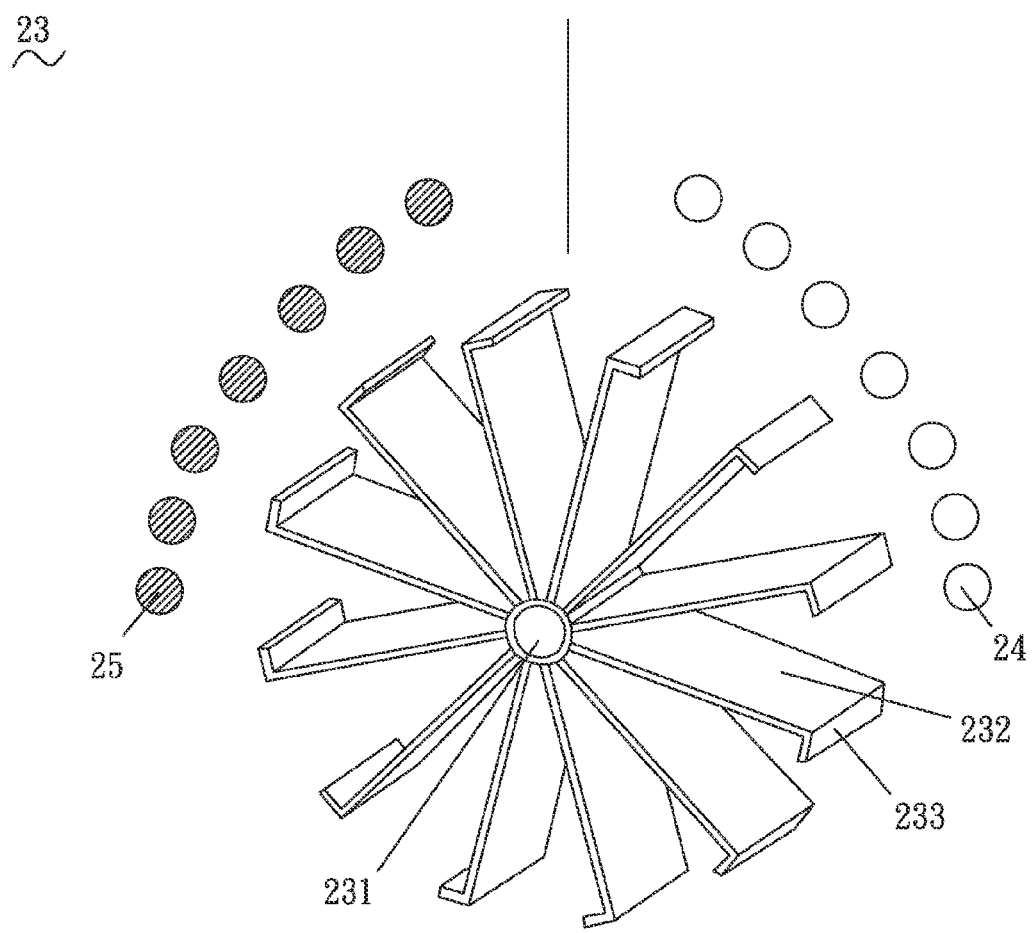
FIG. 2 is a view of a recycling system of the dewaxing device shown in FIG. 1.

With reference to FIG. 1 and FIG. 2, a dewaxing device according to an embodiment of the present invention is used in dewaxing process of metal injection molding for removing wax of a green part of product by virtue of utilizing chemical solvent to soak and repeatedly rinse the green part of product. In this embodiment, the chemical solvent is bromopropane solvent. The dewaxing device includes a dewaxing system 10 and a recycling system 20.

The dewaxing system 10 is used to dewax the green part of product. In detail, the dewaxing system 10 includes a rinsing device 11 where the green part of product is placed for being soaked and rinsed with the bromopropane solvent, and a storage device 12 where the bromopropane solvent is stored. The storage device 12 is connected with the rinsing device 11 via a circulation pipe so that the bromopropane solvent can circulation flow through the rinsing device 11 to repeatedly rinse the green part of product so as to dissolve the wax out of the green part of product as thorough as possible. The storage device 12 is equipped with a heating equipment 13 which is used to heat the bromopropane solvent so as to improve dewaxing efficiency. A condensing equipment 14 is connected between the rinsing device 11 and the storage device 12 via another pipe. Because bromopropane is highly volatile, the condensing equipment 14 is used to condense volatilized bromopropane steam in the dewaxing process into liquid bromopropane solvent and further make the condensed bromopropane solvent flow back into the storage device 12.

The recycling system 20 is connected with the storage device 12 of the dewaxing system 10 for treating mixed solution with wax into pure chemical solvent. In detail, the recycling system 20 includes a containing trough 21 connected with the storage device 12 via a pipe, and a recycling trough 22 connected between the containing trough 21 and the storage device 12 via another pipe. The containing trough 21 is used to contain mixed bromopropane solution with wax from the storage device 12. The recycling trough 22 is used to contain pure bromopropane solvent from the containing trough 21 and further convey the pure bromopropane solvent back into the storage device 12 to be reused.

The recycling system 20 further includes a rotating device 23, a condensing unit 24 and a heating unit 25 which cooperate to treat the mixed bromopropane solution into the pure bromopropane solvent in the containing trough 21. In detail, the rotating device 23 is rotatably mounted above the containing trough 21. The condensing unit 24 and the heating unit 25 are disposed at two opposite sides of the rotating device 23. The rotating device 23 rotates towards the condensing unit 24. The rotating device 23 includes a shaft 231 and a plurality of blades 232 radially extending outward around outer periphery of the shaft 231 and arranged at regular intervals on generatrices of the shaft 231. The condensing unit 24 and the heating unit 25 are mounted at two sides of the top half of the rotating device 23 at the shaft 231 boundaries. Free ends of the blades 232 could be further provided with columnar or block metal slices 233 for increasing contact area of the blades 232 with the mixed solution contained in the containing trough 21. The shaft 231 is hollow for gathering liquid waste wax removed out from the mixed solution.

In use, the dewaxing system 10 is firstly used to dewax the green part of product. When the bromopropane solvent in the storage device 12 is monitored to reach saturation state, the saturated solution with wax is conveyed into the containing trough 21. The bottom half of the rotating device 23 at the shaft 231 boundaries is dived into the saturated solution with wax. Then, the rotating device 23 is driven to rotate towards the condensing unit 24 so as to utilize the condensing unit 24 to rapidly cool the blades 232 close to the condensing unit 24. With the rotation of the rotating device 23, the cooled blades 232 are further rotated into the saturated solution to cool the saturated solution contacting with the cooled blades 232. As a result, the solubility of the cooled saturated solution is decreased to precipitate wax out of the cooled saturated solution, and the precipitated wax is adhered on the blades 232 and the metal slices 233. Last, the blades 232 and the metal slices 233 together with the precipitated wax are rotated out of the mixed solution to close the heating unit 25 and be rapidly heated by the heating unit 25 so as to melt the precipitated wax into liquid. Then with the upward rotation of the rotating device 23, the liquid wax flows into the shaft 231 along the blades 232 by virtue of its own gravity. So the wax dissolved in the mixed solution can be gradually removed and gathered by the foregoing recycling process to make the saturated solution with wax become pure bromopropane solvent. Then the pure bromopropane solvent flows into the recycling trough 22 and further is conveyed back into the storage device 12 to be reused.

Figure 3:
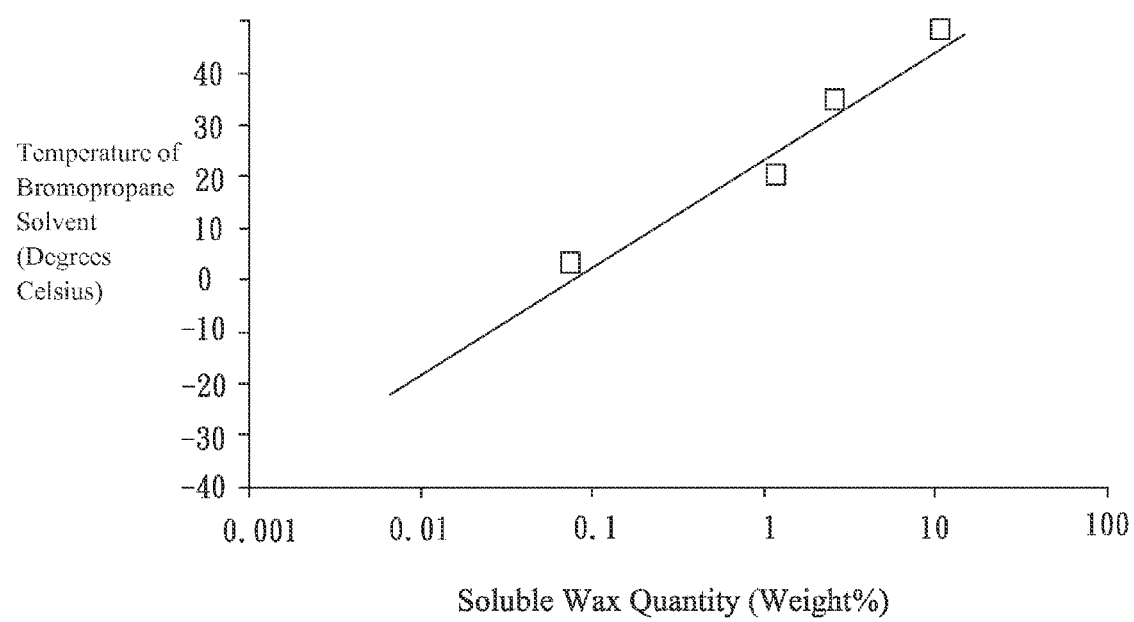
FIG. 3 is a view showing the soluble wax quantity of bromopropane solvent does change with temperature.

The technical principle used in the recycling process of the dewaxing device in this invention is that the soluble wax quantity of the bromopropane solvent does change with temperature. As shown in FIG. 3, the soluble wax quantity of the bromopropane solvent can reach a maximum value of 16% at 45 degrees Celsius, but once back to the room temperature, the soluble wax quantity of the bromopropane solvent will plummet to about 3%; when the temperature of the bromopropane solvent is 0 degrees Celsius, the soluble wax quantity has fallen to 0.1%; if the temperature of the bromopropane solvent continues to be cooled to −30 degrees Celsius, the soluble wax quantity is about 0.01% and the bromopropane solvent is almost pure.

As described above, according to the technical principle that the soluble wax quantity of the bromopropane solvent does change with temperature, the dewaxing device in this invention utilizes the cooperation design of the rotating device 23 and the condensing and the heating units 24, 25 to effectively remove the wax in the saturated solution and obtain pure bromopropane solvent in the recycling process.

What is claimed is:

1. A dewaxing device of utilizing chemical solvent to dewax a green part of product formed by metal injection molding, comprising:
   a dewaxing system for dewaxing the green part of product, the dewaxing system including a rinsing device where the green part of product is placed and a storage device where the chemical solvent is stored, the storage device being connected with the rinsing device via a circulation pipe for utilizing the chemical solvent to soak and rinse the green part of product; and
   a recycling system including a containing trough which is connected with the storage device for containing mixed solution with wax from the storage device, and a recycling trough which is connected between the containing trough and the storage device for containing and conveying pure chemical solvent from the containing trough back into the storage device to be reused, the recycling system further including a rotating device, a condensing unit and a heating unit which cooperate to treat the mixed solution with wax into the pure chemical solvent in the containing trough, the rotating device being rotatably mounted above the containing trough with the bottom half thereof being dived into the mixed solution, the condensing unit and the heating unit being disposed at two opposite sides of the top half of the rotating device, the rotating device being rotated towards the condensing unit;
   wherein the rotating device includes a hollow shaft and a plurality of blades radially extending outward around outer periphery of the shaft and arranged at regular intervals on generatrices of the shaft, in use, the blades are firstly cooled by the condensing unit to be rotated into the mixed solution for locally cooling the mixed solution to make wax precipitated out of the cooled mixed solution and adhered on the cooled blades, the blades together with the precipitated wax are further rotated out of the mixed solution to be heated by the heating unit for melting the precipitated wax into liquid, then the liquid wax flows into the hollow shaft along the blades by virtue of its own gravity with the upward rotation of the rotating device.

2. The dewaxing device as claimed in claim 1, wherein free ends of the blades of the rotating device could be further provided with columnar or block metal slices for increasing contact area of the blades with the mixed solution contained in the containing trough.

\* \* \* \* \*